United States Patent
Wetlesen et al.

(10) Patent No.: US 11,992,864 B2
(45) Date of Patent: May 28, 2024

(54) NOZZLE ARRANGEMENT FOR INJECTING LIQUID INTO A TANK

(71) Applicant: ORECO A/S, Lynge (DK)

(72) Inventors: Kaare Wessel Wetlesen, Rungsted Kyst (DK); Ole Meldgaard Nielsen, Målov (DK)

(73) Assignee: ORECO A/S, Vaerlose (DK)

(*) Notice: Subject to any disclaimer, the term of this patent is extended or adjusted under 35 U.S.C. 154(b) by 607 days.

(21) Appl. No.: 17/261,893

(22) PCT Filed: Jul. 24, 2019

(86) PCT No.: PCT/DK2019/050234
§ 371 (c)(1),
(2) Date: Jan. 21, 2021

(87) PCT Pub. No.: WO2020/020424
PCT Pub. Date: Jan. 30, 2020

(65) Prior Publication Data
US 2021/0299717 A1    Sep. 30, 2021

(30) Foreign Application Priority Data
Jul. 27, 2018    (DK) ............................ PA 2018 70507

(51) Int. Cl.
B08B 9/093    (2006.01)
B05B 13/06    (2006.01)
F16H 1/16    (2006.01)

(52) U.S. Cl.
CPC ........ B08B 9/0936 (2013.01); B05B 13/0636 (2013.01); F16H 1/16 (2013.01)

(58) Field of Classification Search
CPC ....... B08B 9/0936; B08B 9/08; B08B 9/0933; B08B 9/0813; B08B 9/093;
(Continued)

(56) References Cited

U.S. PATENT DOCUMENTS 2,105,458 A * 1/1938 Johnson ................ B05B 3/0445
239/227
2,661,241 A * 12/1953 Veneziano ............ B08B 9/0936
134/167 R
(Continued)

FOREIGN PATENT DOCUMENTS

EP    2638973 A1    9/2013
EP    3829780 B1    9/2022
(Continued)

OTHER PUBLICATIONS

European Patent Application No. 19745971.2; Notice of Opposition; dated Jun. 14, 2023; 32 pages.
(Continued)

*Primary Examiner* — David G Cormier
*Assistant Examiner* — Thomas Bucci
(74) *Attorney, Agent, or Firm* — BakerHostetler

(57) ABSTRACT

The present invention relates to a nozzle arrangement and method for removing solids and/or fluids, such as sludge, preferably suspended or contained in fluid, from tanks such as oil/mud-tanks and other similar difficult accessible deposits and tanks/tanks. In preferred embodiments, the nozzle arrangement has a rotating mechanism (8) comprising a primary drive shaft (13) being connected to a pipe section (4), a row of gear teeth (9) fixedly arranged on or formed in lower end of a down pipe (3) on an outside thereof, an angular gear (10), a worm gear (16) arranged to rotate an angled nozzle pipe section (7) at the cleaner head (5) driven by the angular gear, a secondary drive shaft (11) rotatably mounted on an outside of said pipe section (4) and having at one end a gear wheel of the angular gear (10) and at the other end a gear wheel co-operating with said row of gear teeth (9).

18 Claims, 4 Drawing Sheets

(58) Field of Classification Search
CPC ..... B08B 2209/08; B08B 3/02; B08B 9/0433; B05B 13/06; B05B 3/0445; B05B 3/14; B05B 3/02; B05B 15/555; B05B 15/68; B05B 3/066; B05B 13/0405; B05B 3/1007; F16H 1/16; B65D 90/0093
USPC ...... 134/167 R, 172, 166 R; 239/263.3, 240, 239/227, 264
See application file for complete search history.

(56) References Cited

U.S. PATENT DOCUMENTS

| | | | |
|---|---|---|---|
| 3,001,534 A | | 9/1961 | Grant |
| 3,275,241 A | * | 9/1966 | Saad ................ B05B 3/0445 239/227 |
| 3,472,451 A | | 10/1969 | Orem et al. |
| 3,556,407 A | * | 1/1971 | Iwajiro Niikura ........ B05B 3/02 239/227 |
| 3,834,625 A | | 9/1974 | Barthod |
| 3,874,594 A | | 4/1975 | Hatley |
| 3,878,857 A | * | 4/1975 | Heibo ................ B08B 9/0936 134/180 |
| 4,426,233 A | * | 1/1984 | Manabe ................ B05B 15/652 210/801 |
| 4,817,653 A | | 4/1989 | Krajicek et al. |
| 5,351,885 A | * | 10/1994 | Manabe ................ B05B 3/021 239/263.1 |
| 5,896,871 A | * | 4/1999 | Larsen ................ B08B 9/0936 134/167 R |
| 2003/0137895 A1 | * | 7/2003 | Hummer ............ B01F 35/1452 366/159.1 |
| 2010/0186784 A1 | | 7/2010 | Ross et al. |

FOREIGN PATENT DOCUMENTS

| | | |
|---|---|---|
| GB | 1340532 A | 12/1973 |
| GB | 2113079 A | 8/1983 |
| JP | 53-132019 U | 10/1978 |
| WO | 2018130650 A2 | 7/2018 |

OTHER PUBLICATIONS

"Bevel gear"; https://en.wikipedia.org/w/index.php?title=Bevel gear &oldid . . . ; Wikipedia; accessed May 25, 2023; 7 pages.

* cited by examiner

NOZZLE ARRANGEMENT FOR INJECTING LIQUID INTO A TANK

CROSS-REFERENCE TO RELATED APPLICATIONS

This application is the National Stage of International Patent Application No. PCT/DK2019/050234, "Nozzle Arrangement for Injecting Liquid into a Tank" (filed Jul. 24, 2019), which claims priority to Danish Patent Application No. PA 2018 70507 (filed Jul. 27, 2018). The foregoing applications are incorporated herein by reference in their entireties for any and all purposes.

FIELD OF THE INVENTION

The present invention relates inter alia to a nozzle arrangement and method for removing solids and/or fluids, such as sludge, preferably suspended or contained in fluid, from tanks such as oil/mud-tanks and other similar difficult accessible deposits and tanks/tanks. In preferred embodiments, the nozzle arrangement has a rotating mechanism comprising a primary drive shaft being connected to a pipe section, a row of gear teeth fixedly arranged on or formed in lower end of a down pipe preferably on an outside thereof, an angular gear, a gear such as a worm gear arranged to rotate a nozzle pipe section at the cleaner head driven by the angular gear, a secondary drive shaft rotatably mounted on an outside of said second pipe section and having at one end a gear wheel of the angular gear and at the other end a gear wheel co-operating with said row of gear teeth.

BACKGROUND OF THE INVENTION

Cleaning of larger tanks, such as oil tanks is a difficult task which often requires that care should be taken to avoid or at least mitigate health risk for personnel involved in cleaning such tanks.

Further, since such cleaning may be carried out at regular intervals, the above mentioned issues are enforced.

Still further, such tanks may need to be cleaned at most internal surfaces such as bottom an side surfaces.

Thus, there exist a need for providing a method and device rendering the cleaning process efficient. Hence, an improved cleaning device and cleaning method would be advantageous, and in particular a more efficient and/or reliable cleaning device and method would be advantageous.

OBJECT OF THE INVENTION

It is a further object of the present invention to provide an alternative to the prior art.

In particular, it may be seen as an object of the present invention to provide a nozzle arrangement, method of use and/or a tank utilizing or comprising the method and/or nozzle arrangement that solves the above mentioned problems of the prior art with

SUMMARY OF THE INVENTION

The invention relates in a first aspect to a nozzle arrangement for injecting a liquid into a tank such as an oil/mud-tank. The nozzle arrangement preferably comprises
  a down pipe
  a pipe section
    rotatably arranged at a lower end of the down pipe with a rotational axis coinciding with a longitudinal axis of the down pipe, and
    said pipe section comprising an angled cleaner head distal to position at which the pipe section is rotatably arranged at the down pipe,
  an angled nozzle pipe section;
  a nozzle hub provided for rotatably connecting the angled nozzle pipe section to pipe section at the cleaner head;
wherein the nozzle arrangement preferably further comprises a rotating mechanism comprising
  a primary drive shaft being connected to said pipe section
  a row of gear teeth fixedly arranged on or formed in lower end of the down pipe on an outside thereof;
  an angular gear;
  a gear, such as a worm gear, arranged to rotate the nozzle pipe section at the cleaner head driven by the angular gear;
  a secondary drive shaft rotatably mounted on an outside of said second pipe section and having at one end a gear wheel of the angular gear and at the other end a gear wheel co-operating with said row of gear teeth.

The invention relates in a second aspect to method of cleaning a tank, such as a mud/oil-tank. Such method preferably comprises:
  providing a nozzle arrangement according to the first aspect in a wall member of a tank;
  providing a connection to a source of cleaning liquid to the nozzle arrangement;
  rotating the primary drive shaft while ejecting the cleaning liquid through the nozzle arrangement.

The invention relates in a third aspect to a tank, such as a mud/oil-tank comprising a nozzle arrangement according to first aspect arranged in a wall section, such as a roof, of said tank.

In the present context, orientations such as "lower" and "upper" are given with reference to the accompanying figures illustrating a preferred orientation relatively to gravity (downward) of the nozzle arrangement. Other orientations of the nozzle arrangement may be implemented thereby shifting orientations such as "lower" and "upper" into e.g. "right" and "left".

The first, second and third aspect of the present invention may each be combined with any of the other aspects. These and other aspects of the invention will be apparent from and elucidated with reference to the embodiments described hereinafter as well as in the accompanying patent claims.

BRIEF DESCRIPTION OF THE FIGURES

The present invention and in particular preferred embodiment thereof will now be described in more details with regard to the accompanying figures. The FIGS. show ways of implementing the present invention and are not to be construed as being limiting to other possible embodiments falling within the scope of the attached claim set.

DETAILED DESCRIPTION OF PREFERRED EMBODIMENTS

Figure 1:
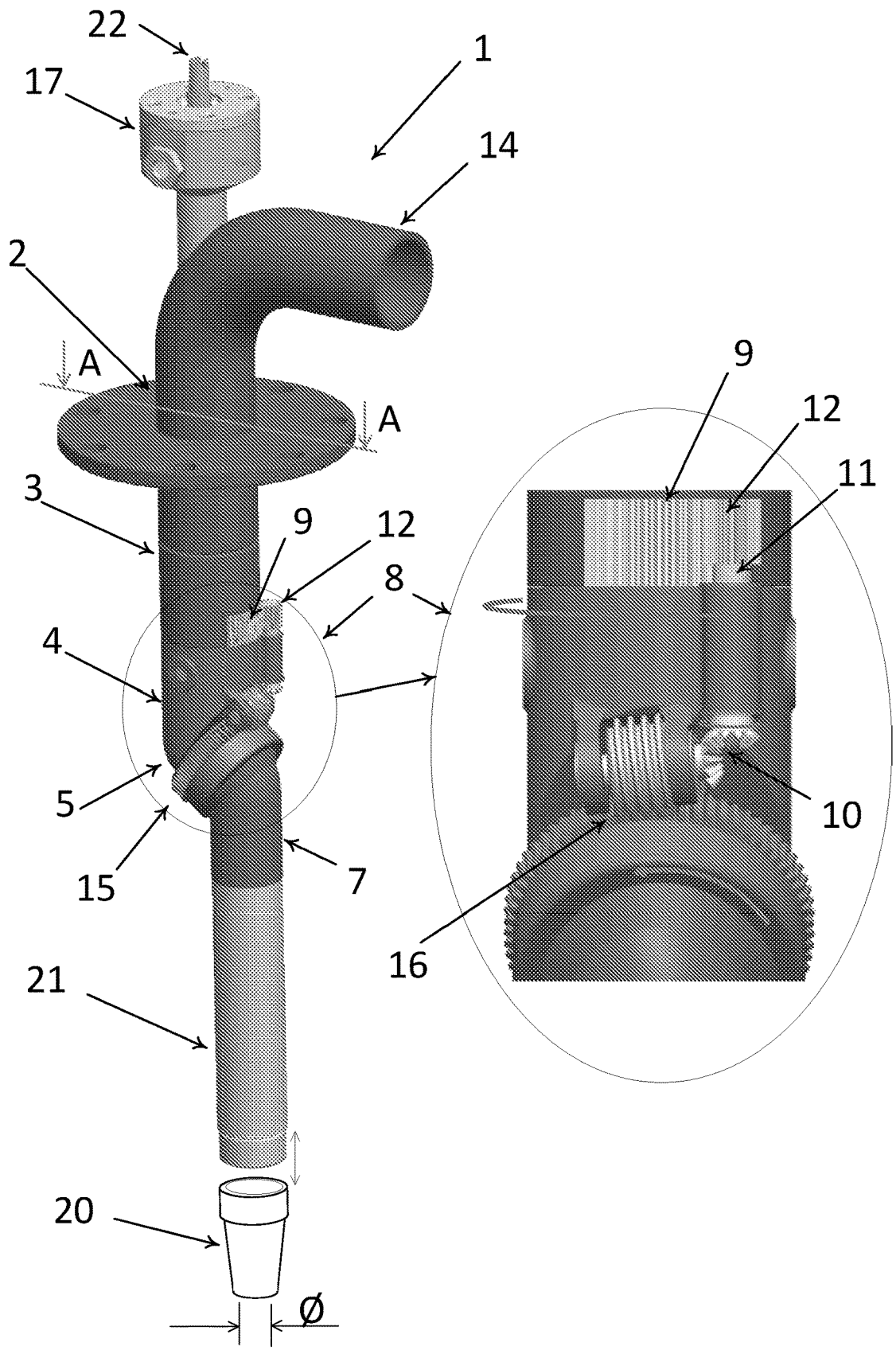
FIG. 1 is a 3-dimensional view of a nozzle arrangement according to an embodiment of the present invention.
Figure 2:
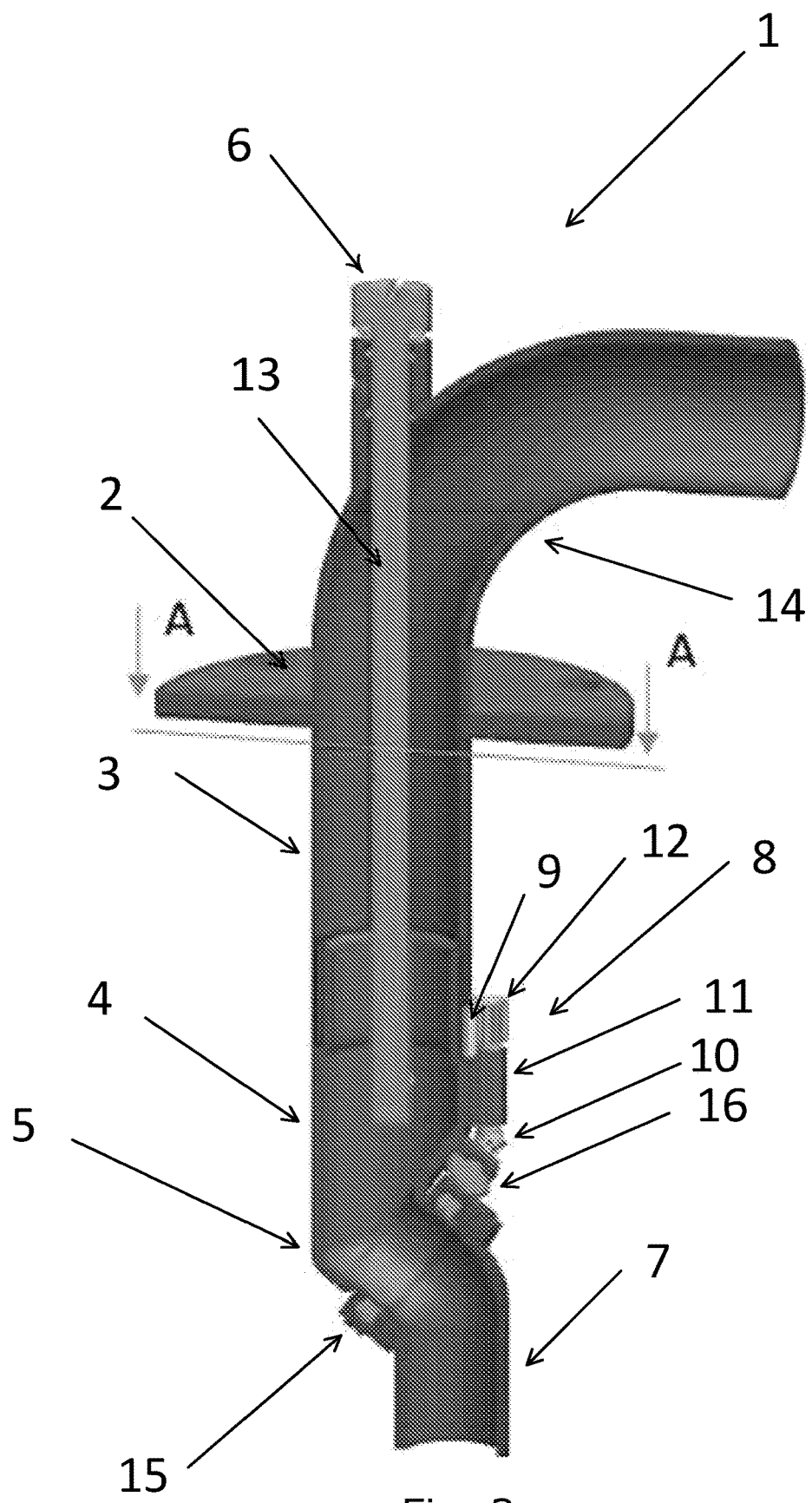
FIG. 2 is a 3-dimensional cross sectional view of the nozzle arrangement of FIG. 1.
Figure 3:
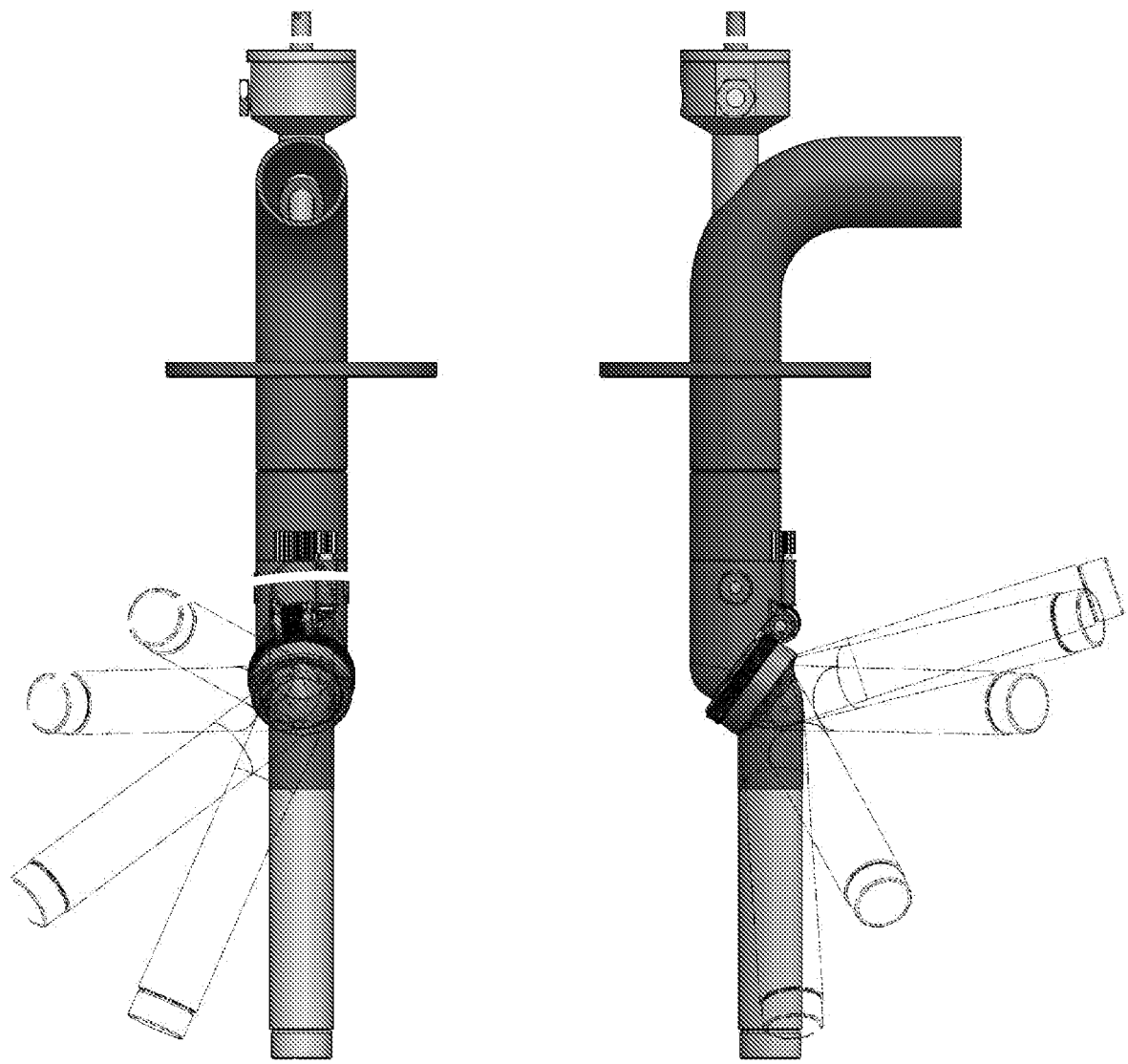
FIG. 3 is a front view and a side view of the nozzle arrangement of FIG. 1; the front and side view illustrates the movement of the nozzle pipe section during rotation of the primary drive shaft.

Reference is made to FIG. 1 which is a 3-dimensional view of a nozzle arrangement according to an embodiment of the present invention and also to FIG. 2 which is a 3-dimensional cross sectional view of the nozzle arrangement of FIG. 1. As presented herein, the nozzle arrangement 1 is intended for injecting a liquid into a tank such as an oil/mud-tank for washing down the interior of such tanks.

As illustrated in FIG. 1 the nozzle arrangement comprising a down pipe 3. This down pipe 3 is maintained in a fixed, non-rotatable position e.g. by use of a mounting flange 2 as illustrated (will be disclosed further below).

The down pipe 3 proceed toward a pipe section 4, which is rotatably arranged at a lower end of the down pipe 3 with a rotational axis coinciding with a longitudinal axis of the down pipe 3. In the embodiment shown in FIG. 1, the down pipe 3 and the pipe section 4 have substantially the same outer diameter have a substantial cylindrical shape, so that the longitudinal axis of the down pipe 3 and the pipe section coincide.

The lower end of the pipe section 4 has an angled cleaner head 5 which is positioned distal to position at which the pipe section 4 is rotatably arranged at the down pipe 3. This angle is in the embodiment shown in FIG. 1 45 degrees but may be selected differently.

The nozzle arrangement also has an angled nozzle pipe section 7, which in the embodiment shown in FIG. 1 is at the upper end of the pipe section. The angle is shown to be 45 degrees, but other angles may be used.

The pipe section 4 and the nozzle pipe section 7 are rotatably connected with each other by a nozzle hub 15 provided for rotatably connecting the angled nozzle pipe section 7 to pipe section 4 at the cleaner head (5). This hub is typically provided with bearings such as sealed bearings between a lower section of the pipe section 4 and the nozzle pipe section 7 and—as visible in FIG. 2—the pipe section 4 has a section extending into the nozzle pipe section 7.

The nozzle arrangement further comprising a rotating mechanism 8 for rotating the pipe section around a longitudinal axis and rotate the nozzle pipe section 7. This rotating mechanism comprises a primary drive shaft 13 being connected to said pipe section 4. As visible in FIG. 2, the primary drive shaft preferably extends inside the down pipe and is connected to the interior of the pipe section 4. The primary drive shaft 13 extend through the down pipe 3 through a sealed passage also including bearings to allow rotation of the primary drive shaft around its longitudinal direction. Thus, by rotating the primary drive shaft 13, the pipe section 4 is rotated the same amount as the rotation of the primary drive shaft 13.

The rotating mechanism also comprises a row of gear teeth 9 fixedly arranged on or formed in lower end of the down pipe 3 on an outside thereof.

It further comprises an angular gear 10 cooperating with the worm gear 16. As illustrated, the worm gear is arranged to rotate the nozzle pipe section 7 at the cleaner head 5 driven by the angular gear. In particular, the worm of the worm gear meshes with a gear provided at the nozzle hub 15 on the nozzle pipe section 7, so that when the worm is rotated by the angular gear 10, the nozzle pipe section is rotated.

A secondary drive shaft 11 is rotatably mounted on an outside of said second pipe section 4 and having at one end a gear wheel of the angular gear 10 and at the other end a gear wheel 12 co-operating with said row of gear teeth 9. Thus, by rotating the primary drive shaft 13, the pipe section 4 rotates. When the gear wheel 12 engages with row of teeth 9, the secondary drive shaft is rotated resulting in a rotation of the angular gear 10 which rotates the worm of the worm gear 16 so that the nozzle pipe section 7 rotates. When the gear wheel 12 does not engage with the row of teeth 9, the pipe section 4 still rotates when the primary drive shaft 13 is rotated. This result in a stroking rotational motion of the nozzle pipe section 7, in the sense that the rotation of the nozzle pipe section only occurs during a part of a full rotation 360 degrees rotation of the pipe section 4.

As most clearly seen in FIG. 2, the primary drive shaft 13 extends inside the down pipe 3 and engages at a lower end thereof with the inside of the pipe section 4 so that a rotation of the primary shaft 13 rotates the pipe section 4. The connection between the primary drive shaft 13 and the pipe section 4 may as illustrated be provided by a cross member extending through the pipe section 4, preferably inserted from the outside, and through the drive shaft 13 at a lower end thereof. Please observe, that in FIG. 2, the mechanical seal 17 has not been shown.

In order to easy arrange, such as secure, the nozzle arrangement to a wall member of e.g. a tank, the nozzle arrangement may further comprise a mounting bracket 2 arranged on the down pipe 3 in a position where one part of the down pipe 3 extends above the mounting bracket 2 and forms an inlet pipe 14 and another part extends below the mounting bracket 2. The inlet pipe 14 is used to feed fluid to the ejected from the nozzle into the nozzle arrangement. The mounting bracket being configured for attaching the nozzle arrangement to wall member, such as a roof or side wall, of the oil/mud-tank. While the nozzle arrangement may be welded to the wall member, it is often preferred to bolt the nozzle arrangement to the wall member to allow easy removal of the nozzle arrangement. To this, the mounting bracket 2 is provided with the illustrated through going holes. The wall member will be provided with an opening being of sufficient size to allow the parts of the nozzle arraignment below the mounting bracket 2 to be introduced into the tank while small enough to allow attachment of the nozzle arranged by use of the mounting bracket.

The gearings, that is the number of teeth in the different gears, of the rotational mechanism are configured so that during a full 360 degrees rotation of the pipe section 4, the nozzle hub 15 and thereby the nozzle pipe section 7 rotates less than 5 degrees, such as less than 4 degrees.

In the preferred embodiments shown in the FIGS. 1-4 the teeth of the row of gear teeth 9 are evenly dispositioned only along a segment of the circumference of the down pipe 3. However, the row of teeth 9 may also be distributed evenly over the whole circumference of the down pipe. While the first option provides a relatively fast rotation of the nozzle pipe section 7, only occurring part time during a full 360 degrees rotation of the pipe section 4, the second option provides a relatively slower rotation of the nozzle pipe section distributed over a full 360 degrees rotation of the pipe section 4. This, it due to the rotation of the nozzle pipe section 7 only occurs when the gear wheel 12 engages with one or more teeth of the row of teeth 9.

Rotation of the primary drive shaft is typically effectuated by a drive unit 23 (see FIG. 5) which engages e.g. with the upper end of the primary drive shaft 13. In the embodiment shown in FIG. 1, a notch structure 22 is provided for engaging with a gear wheel, which gear is rotated by the drive unit 23. Such a drive unit 23 may be an electrical or hydraulic motor, adapted to rotate the primary drive shaft 13. The drive unit 23 may alternatively be arranged inside the down pipe 3.

Figure 5:
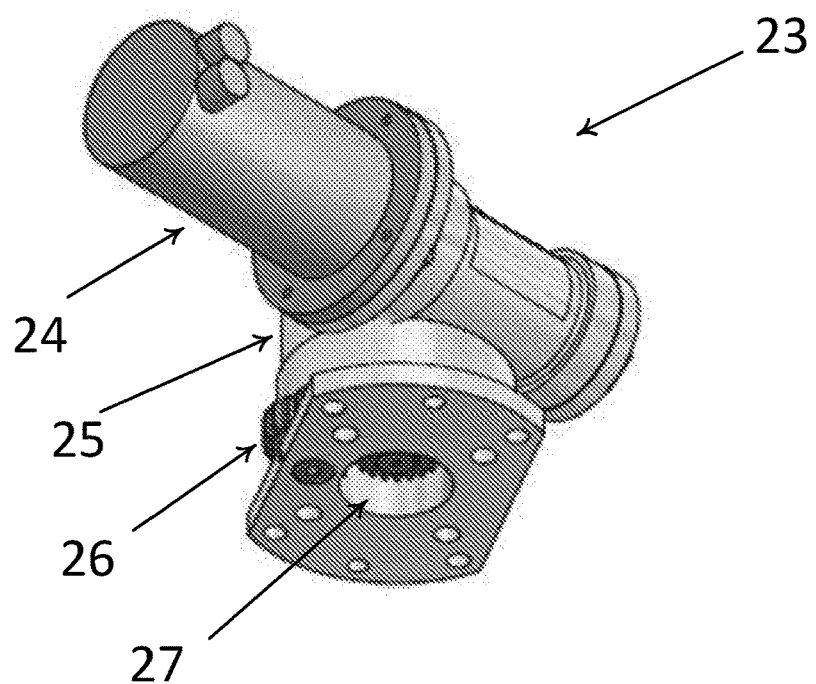
FIG. 5 is an illustration of a drive unit according preferred embodiments of the invention.

FIG. 5 illustrates an example on a drive unit 23. The drive unit comprising a motor 24, such as a hydraulic or electrical powered motor which is connected to a gearbox 25, such as a worm gear, arranged to rotate a driving gear 26. The driving gear mesh, when the drive unit 23 is installed, with a primary drive shaft gear 27 which is arranged to rotate the primary drive shaft 13 upon rotation of the primary drive shaft gear 27. In the illustration of FIG. 5, the primary drive shaft gear 27 is not shown, but it is illustrated to fit into the opening pointed at by numeral 27. In one embodiment, the primary drive shaft gear 27 has a spline which mate the notch 22 on the primary drive shaft 13. Typically, the driving gear 26 and the primary drive shaft gear are both straight-toothed and the driving gear has twenty-three teeth and the primary drive shaft gear 27 has forty teeth.

In the embodiments shown in FIGS. 1-4, the part of the down pipe 3 extending above the mounting bracket 2 and forming an inlet pipe 14 has a bend 14, which may be in 90 degrees. In such embodiments, the primary drive shaft 13 advantageously extends inside the down pipe 3 and engages at a lower end thereof with the inside of the pipe section 4 e.g. as disclosed above so that a rotation of the primary shaft 13 rotates the pipe section 4, and the primary drive shaft 13 extends to an outside mounted drive unit 23 (such as a drive unit disclosed above) though an opening provided in said bend 14.

As illustrated in FIG. 1, the nozzle arrangement has a mechanical seal 17 arranged at the bend of the inlet pipe 14, through which mechanical seal 17 the primary drive shaft 13 extends through to provide a sealed routing of the primary drive shaft 13.

Accordingly, the drive unit 23 is arranged to engage the primary drive shaft 13 at the end extending to the outside through said opening, which may be a sealed opening by the mechanical seal 17, provided in said bend 14.

Figure 4:
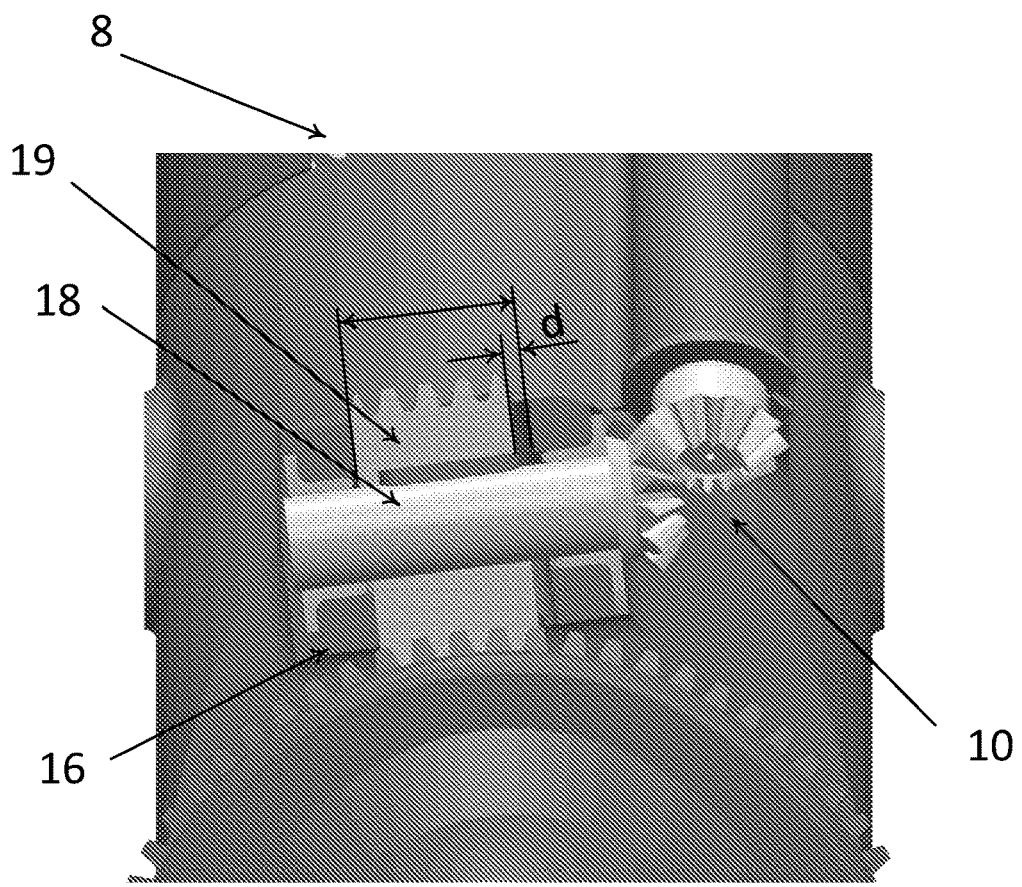
FIG. 4 is close-up illustration of a part of the rotating mechanism in which view a cross sectional view is shown to illustrate the interior of the worm of the worm gear.

Reference is made to FIG. 4. Which is a close-up illustration of a part of the rotating mechanism in which view a cross sectional view is shown to illustrate the interior of the worm of the worm gear. As illustrated, the worm 19 of the worm gear 16 is arranged longitudinally slideable on a worm shaft 18 connected at one end to the angular gear 10. The distance the worm may slide is illustrated with "d" in FIG. 4. This has the effect that upon reversing the rotational direction of the pipe section 4, there is a lack of rotation of the nozzle pipe section 7 until the worm has travelled the distance "d".

This, has the advantage that in some situation the fluid makes flushing trail when e.g. the nozzle travels upwardly (the movement shown in FIG. 3) leaving areas unflushed. Such flushing trails may be flushed by reversing the rotational direction so that the nozzle travels downward, since the slide-ability of the worm 19 will offset the travel of the nozzle as an initial rotation of the worm will result in that only the worm moves along the worm shaft 19.

The nozzle arrangement may as illustrated in FIG. 1 e.g. comprise a tubular nozzle extension 21 arranged at a distal end of the nozzle pipe section 7. Such a nozzle extension 21 may be a replaceable part and may allow for configuring the nozzle arrangement to have different lengths.

In order to enhance the cleaning operation by use of the nozzle arrangement, it may be beneficial to provide the fluid as a jet with a relatively high momentum. To this, the nozzle pipe section 7 the nozzle extension 21 (when applied) may comprising a nozzle tip 20 (see FIG. 1) arranged at the distal end, relatively to the nozzle hub 15, of the nozzle pipe 7 and configured to accelerate fluid flowing through the nozzle tip 20. The nozzle tip 20 may be provided as tubular section having a converging cross sectional area toward the outlet of the nozzle tip.

Typical dimensions for the cross sectional area at the outlet of the nozzle tip (20) may be a diameter or hydraulic diameter of 16 mm, such as of 18 mm, such 20 mm.

The invention also relates to a method of cleaning a tank, such as a mud/oil-tank. Such method may comprise
providing a nozzle arrangement as disclosed herein in a wall member of a tank;
providing a connection to a source of cleaning liquid to the nozzle arrangement;
rotating the primary drive shaft 13 while ejecting the cleaning liquid through the nozzle arrangement.

Further, the invention also relates to a tank, such as a mud/oil-tank comprising a nozzle arrangement according to any of the preceding claims arranged in a wall section, such as a roof, of said tank.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

REFERENCE NUMERALS USED HEREIN

1 Nozzle arrangement
2 Mounting bracket
3 Down pipe
4 Pipe section
5 Cleaner head
6 Drive mechanism
7 Nozzle pipe section
8 Rotating mechanism
9 Row of teeth
10 Angular gear
11 Secondary drive shaft
12 Gear wheel
13 Primary drive shaft
14 Inlet pipe
15 Nozzle hub
16 Worm gear
17 Mechanical seal
18 Worm shaft
19 Worm of worm gear
20 Nozzle tip
21 Tubular nozzle extension 22 Notch for engaging with e.g. a gear wheel
23 Drive unit
24 Motor
25 Gear box
26 Driving gear
27 Primary drive shaft gear

The invention claimed is:

1. A nozzle arrangement for injecting a liquid into a tank, said nozzle arrangement comprising:
   a down pipe (3) having a lower end;
   a pipe section (4)
      rotatably arranged at a lower end of the down pipe (3) with a rotational axis coinciding with a longitudinal axis of the down pipe (3), and
      said pipe section (4) comprising an angled cleaner head (5) distal to position at which the pipe section (4) is rotatably arranged at the down pipe (3);
   an angled nozzle pipe section (7);
   a nozzle hub (15) provided for rotatably connecting the angled nozzle pipe section (7) to the pipe section (4) at the cleaner head (5);
wherein the nozzle arrangement further comprises a rotating mechanism (8) comprising
   a primary drive shaft (13) being connected to said pipe section (4);
   a row of gear teeth (9) fixedly arranged on or formed in the lower end of the down pipe (3) on an outside thereof;
   an angular gear (10);
   a worm gear (16) arranged to rotate the nozzle pipe section (7) at the cleaner head (5) driven by the angular gear; and
   a secondary drive shaft (11) rotatably mounted on an outside of said pipe section (4) and having at one end a gear wheel of the angular gear (10) and at the other end a gear wheel (12) co-operating with said row of gear teeth (9).

2. The nozzle arrangement according to claim 1, wherein the primary drive shaft (13) extends inside the down pipe (3) and engages at a lower end thereof with the inside of the pipe section (4) so that a rotation of the primary shaft (13) rotates the pipe section (4).

3. The nozzle arrangement according to claim 1, further comprising a mounting bracket (2) arranged on said down pipe (3) in a position where one part of the down pipe (3) extends above said mounting bracket (2) and forms an inlet pipe (14) and another part extends below the mounting bracket (2), said mounting bracket being configured for attaching the nozzle arrangement to a wall member of the tank.

4. The nozzle arrangement according to claim 1, wherein the rotating mechanism is configured so that during a full 360 degrees rotation of the pipe section (4), the nozzle hub (15), and thereby the nozzle pipe section (7), rotates less than 5 degrees.

5. The nozzle arrangement according to claim 1, wherein the teeth of the row of gear teeth (9) are evenly dispositioned only along a segment of the circumference of the down pipe (3).

6. The nozzle arrangement according to claim 1, further comprising a drive unit (23) adapted to rotate the primary drive shaft (13).

7. The nozzle arrangement according to claim 6, wherein the drive unit (23) further comprising a gearbox (25) arranged to rotate a driving gear (26), the driving gear meshes with a primary drive shaft gear (27) which is arranged to rotate the primary drive shaft (13) upon rotation of the primary drive shaft gear (27).

8. The nozzle arrangement according to claim 3, wherein the part of the down pipe (3) extending above the mounting bracket (2) and forming an inlet pipe (14) comprising a bend and wherein the primary drive shaft (13) extends inside the down pipe (3) and engages at a lower end thereof with the inside of the pipe section (4) so that a rotation of the primary shaft (13) rotates the pipe section (4) and said primary drive shaft (13) extends to an outside mounted drive unit (23) though an opening provided in said bend (14).

9. The nozzle arrangement according to claim 8, further comprising a mechanical seal (17) arranged at said bend of the inlet pipe (14) through which mechanical seal (17) the primary drive shaft (13) extends through to provide a sealed routing of the primary drive shaft (13).

10. The nozzle arrangement according to claim 8, wherein the drive unit (23) is arranged to engage the primary drive shaft (13) at the end extending to the outside through said opening provided in said bend (14).

11. The nozzle arrangement according to claim 1, wherein a worm (19) of the worm gear (16) is arranged longitudinally slideable on a worm shaft (18) connected at one end to the angular gear (10).

12. The nozzle arrangement according to claim 1, further comprising a tubular nozzle extension (21) arranged at a distal end of the nozzle pipe section (7).

13. The nozzle arrangement according to claim 1, wherein the nozzle pipe section (7) comprises a nozzle tip (20) having an outlet and arranged at a distal end, relative to the nozzle hub (15), of the nozzle pipe section (7), and the nozzle tip (20) being configured to accelerate fluid flowing through the nozzle tip (20).

14. The nozzle arrangement according to claim 13, wherein the cross sectional area at the outlet of the nozzle tip (20) has a diameter or hydraulic diameter of from 16 mm to 20 mm.

15. A method of cleaning a tank, comprising:
   providing the nozzle arrangement according to claim 1 in a wall member of a tank;
   providing a connection to a source of cleaning liquid to the nozzle arrangement;
   rotating the primary drive shaft (13) while ejecting the cleaning liquid through the nozzle arrangement.

16. A tank comprising the nozzle arrangement according to claim 1 arranged in a wall section of said tank.

17. The nozzle arrangement of claim 12, wherein the tubular nozzle extension (21) comprises a nozzle tip (20) arranged at a distal end, relative to the nozzle hub (15), of the tubular nozzle extension (21) and configured to accelerate fluid flowing through the nozzle tip (20), said nozzle tip (20) being provided as tubular section having a converging cross sectional area toward an outlet of the nozzle tip.

18. The nozzle arrangement according to claim 13, wherein said nozzle tip (20) is provided as tubular section having a converging cross sectional area towards an outlet of the nozzle tip.

* * * * *